US011188748B2

(12) United States Patent
Goyal et al.

(10) Patent No.: US 11,188,748 B2
(45) Date of Patent: Nov. 30, 2021

(54) SCALABLE STRUCTURE LEARNING VIA CONTEXT-FREE RECURSIVE DOCUMENT DECOMPOSITION (71) Applicant: International Business Machines Corporation, Armonk, NY (US)

(72) Inventors: Munish Goyal, Yorktown Heights, NY (US); Avinash Arya, Akbarpur (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/571,301

(22) Filed: Sep. 16, 2019

(65) Prior Publication Data

US 2021/0081662 A1     Mar. 18, 2021

(51) Int. Cl.
*G06K 9/00* (2006.01)
*G06K 9/52* (2006.01)

(52) U.S. Cl.
CPC ......... *G06K 9/00469* (2013.01); *G06K 9/522* (2013.01); *G06K 2009/00489* (2013.01); *G06K 2209/01* (2013.01)

(58) Field of Classification Search
None
See application file for complete search history.

(56) References Cited

U.S. PATENT DOCUMENTS

| 5,073,953 A | 12/1991 | Westdijk |
| 5,335,290 A | 8/1994 | Cullen |
| 6,307,962 B1 | 10/2001 | Parker |
| 6,853,854 B1 * | 2/2005 | Proniewicz .......... A61B 5/1455 382/128 |
| 7,046,848 B1 * | 5/2006 | Olcott ................ G06K 9/00442 382/176 |
| 7,400,768 B1 | 7/2008 | Mayzlin |
| 7,889,885 B2 * | 2/2011 | Cordery ................ G07D 7/185 382/101 |
| 8,249,344 B2 | 8/2012 | Viola et al. |

(Continued)

FOREIGN PATENT DOCUMENTS

CN     102782705 A     11/2012

OTHER PUBLICATIONS

Grover et al., "NODE2VEC: Scalable Feature Learning for Networks," 22nd ACM SIGKDD International Conference on Knowledge Discovery and Data Mining, KDD 2016, Aug. 2016, San Francisco, California, 10 pages.

(Continued)

*Primary Examiner* — Anand P Bhatnagar
(74) *Attorney, Agent, or Firm* — Vanleeuwen & VanLeeuwen; Christopher M. Pignato (57) ABSTRACT An approach is provided in which the approach aggregates a set of pixel values from a bitmap image into a set of row sum values and a set of column sum values. The bitmap image is a pixelated representation of a document. The approach applies a localized Fourier transform to the set of row sum values and the set of column sum values to generate frequency representations of the set of row sum values and the set of frequency sum values. The approach decomposes the bitmap image into a set of image portions based on at least one separation location identified in the set of frequency representations, and sends the set of image portions to a text recognition system.

20 Claims, 10 Drawing Sheets

(56) References Cited

U.S. PATENT DOCUMENTS

| | | | |
|---|---|---|---|
| 8,311,331 B2 | 11/2012 | Nijemcevic | |
| 8,739,022 B2 | 5/2014 | Chiu et al. | |
| 10,032,257 B2* | 7/2018 | Eguchi | G06T 3/4053 |
| 10,515,606 B2* | 12/2019 | Post | G09G 3/2092 |
| 10,922,540 B2* | 2/2021 | Stanley | G06N 3/08 |
| 2008/0050025 A1* | 2/2008 | Bashyam | H04N 19/129 |
| | | | 382/238 |
| 2009/0125607 A1* | 5/2009 | Rhoads | H04N 1/32352 |
| | | | 709/217 |
| 2016/0373722 A1 | 12/2016 | Mishra | |
| 2017/0186140 A1* | 6/2017 | Eguchi | G06T 3/4053 |
| 2018/0084149 A1 | 3/2018 | Chang | |
| 2018/0090096 A1* | 3/2018 | Post | G09G 3/2092 |
| 2019/0087395 A1 | 3/2019 | Priestas et al. | |

OTHER PUBLICATIONS

Anonymous, "Recognizing Semantic Formatting Information in a Document," ip.com, IPCOM000251990D, Dec. 2017, 35 pages.

Anonymous, "Electronic Document Navigation Assistance Using Markings and/or Non-Uniform Scrolling," ip.com, IPCOM000252364D, Jan. 2018, 39 pages.

Anonymous, "Incremental sharing using machine learning," ip.com, IPCOM000252683D, Feb. 2018, 33 pages.

Wang et al., "Structure Learning Via Parameter Learning," ACM International Conference on Information and Knowledge Management, CIKM 2014, Nov. 2014, Shanghai, China, 10 pages.

Polyakova et al., "Document Image Segmentation using Averaging Filtering and Mathematical Morphology," 2018 14th International Conference on Advanced Trends in Radioelecrtronics, Telecommunications and Computer Engineering (TCSET), Feb. 2018, Lviv-Slavske, Ukraine, pp. 966-969.

Simard et al., "An Efficient Binary Image Activity Detector Based On Connected Components," 2004 IEEE International Conference on Acoustics, Speech, and Signal Processing, May 2004, Montreal, QC, Canada, pp. 229-232.

International Search Report and Written Opinion for International Application No. PCT/IB2020/058572, National Intellectual Property Administration, Beijing, China, Dec. 24, 2020, 10 pages.

* cited by examiner

Company ABC
100 Main Street
Anytown USA 12345

| Remit To: | Company ABC<br>100 Main Street<br>Anytown, USA 12345 | Invoice Date: 05/13/19 | Page: 1 of 1 | Invoice #: 879523 |
|---|---|---|---|---|
| | | Payment Terms:<br>NET45 | Currency:<br>USD | Sales Order #: 17704 |
| Invoice Inquiries:<br>Phone: 123-456-789 | | Customer PO:<br>4508336892 | Rep Order No: 047084<br>Project No: | |
| | | Contact Name: | Contact Phone #: | |
| Invoice To: | Customer ABC<br>100 Any Street<br>Maintown USA 98765 | Ship To: | Customer ABC<br>100 Any Street<br>Maintown USA 98765 | |
| Attention: | 998309583 | Attention: | 4123515 | |

| Cust Line # | Line # | Description | Qty | Unit Price | Total Amount |
|---|---|---|---|---|---|
| 0002 | 2 | Widget | 1 | 3,787 | 3,787 |
| | | Actual ship date: 5/13/19<br>Shippped From: Anytown, US<br>Shipped via: customer pickup | | | |
| | | HTS: US54029U3029U  ECCN: US0085  Ship Ref: 50U208285<br>Unit:  Tag:  S/N:<br>2035820395  Bypass  P0850285 | | | |

Net Due Date: 6/27/19

Subtotal: 3,787
Tax: 0
Total: 3,787

Unless otherwise expressly agreed in writing, the supply of all goods and services covered under the offer made above shall be exclusively governed by the terms and conditions of sale, Form b, printed on the reverse side here of. Any proposal for additional or different terms or variance and buyers acceptance, whether by purchase order or otherwise, shall not operate as a rejection of this offer to sell, but shall be deemed a material alteration there of, and this offer shall be deemed accepted by buyer without such additional or different terms.

SCALABLE STRUCTURE LEARNING VIA CONTEXT-FREE RECURSIVE DOCUMENT DECOMPOSITION

BACKGROUND

Today's document processing systems streamline the capture, recognition and classification of enterprise documents to extract important information. Document processing systems use optical character recognition (OCR), natural language processing, text analytics, and machine learning technologies to automatically identify, classify and extract content from unstructured or variable documents.

Some document processing systems use supervised or semi-supervised machine learning techniques to extract text and document structure from scanned files or PDF files. Other document processing systems require a human to finger print a document, which is then used to extract information from documents of similar types. Yet other document processing systems use a combination of human supervision and deep learning to mine, learn text boundaries, build ontologies, and use the information in an attempt to extract information from documents of similar type. Each of these document processing systems relies on reliable text extraction, understanding the text content, and understanding the context of the document.

BRIEF SUMMARY

According to one embodiment of the present disclosure, an approach is provided in which the approach aggregates a set of pixel values from a bitmap image into a set of row sum values and a set of column sum values. The bitmap image is a pixelated representation of a document. The approach applies a localized Fourier transform to the set of row sum values and the set of column sum values to generate frequency representations of the set of row sum values and the set of frequency sum values. The approach decomposes the bitmap image into a set of image portions based on at least one separation location identified in the set of frequency representations, and sends the set of image portions to a text recognition system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
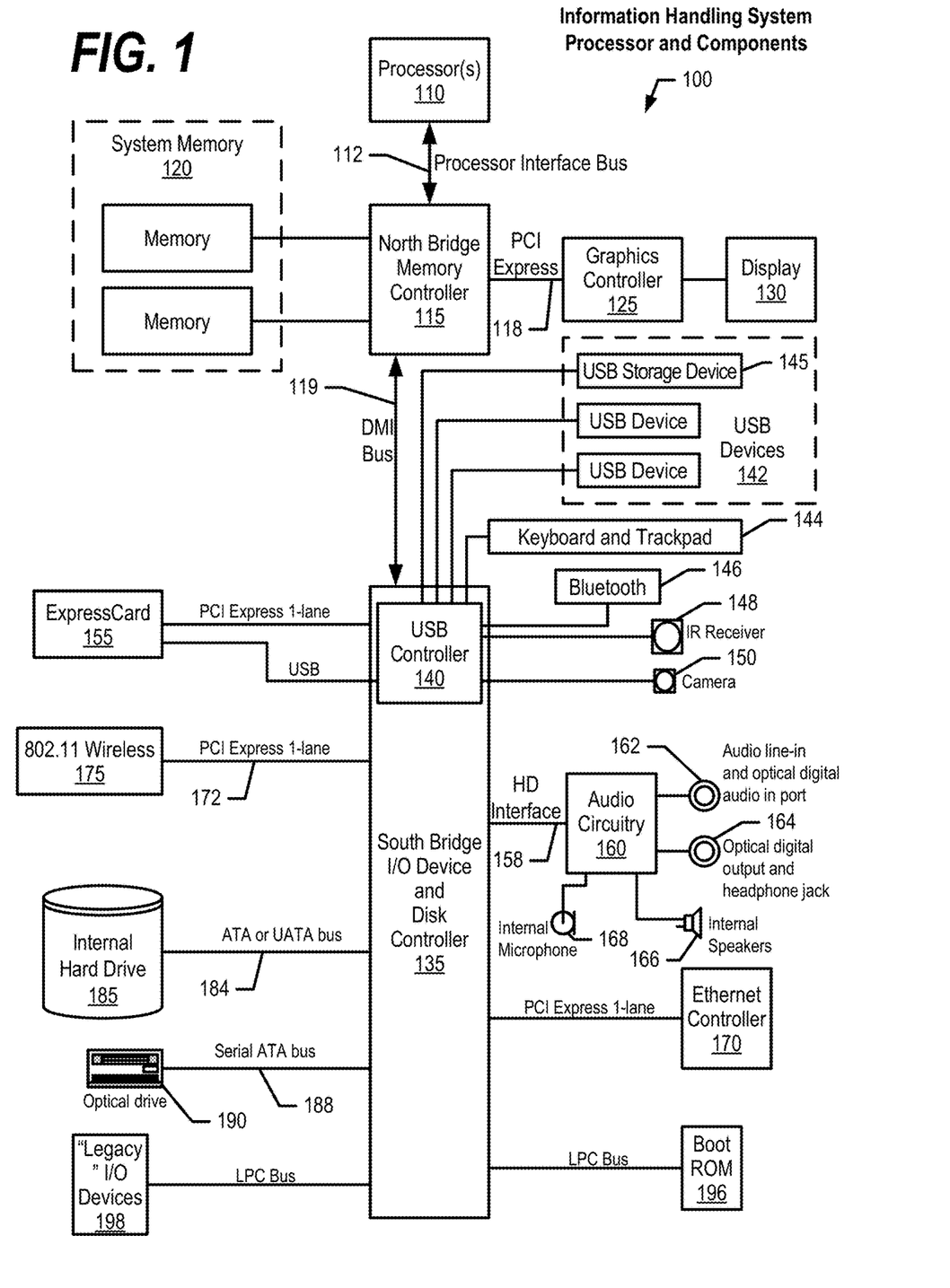
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
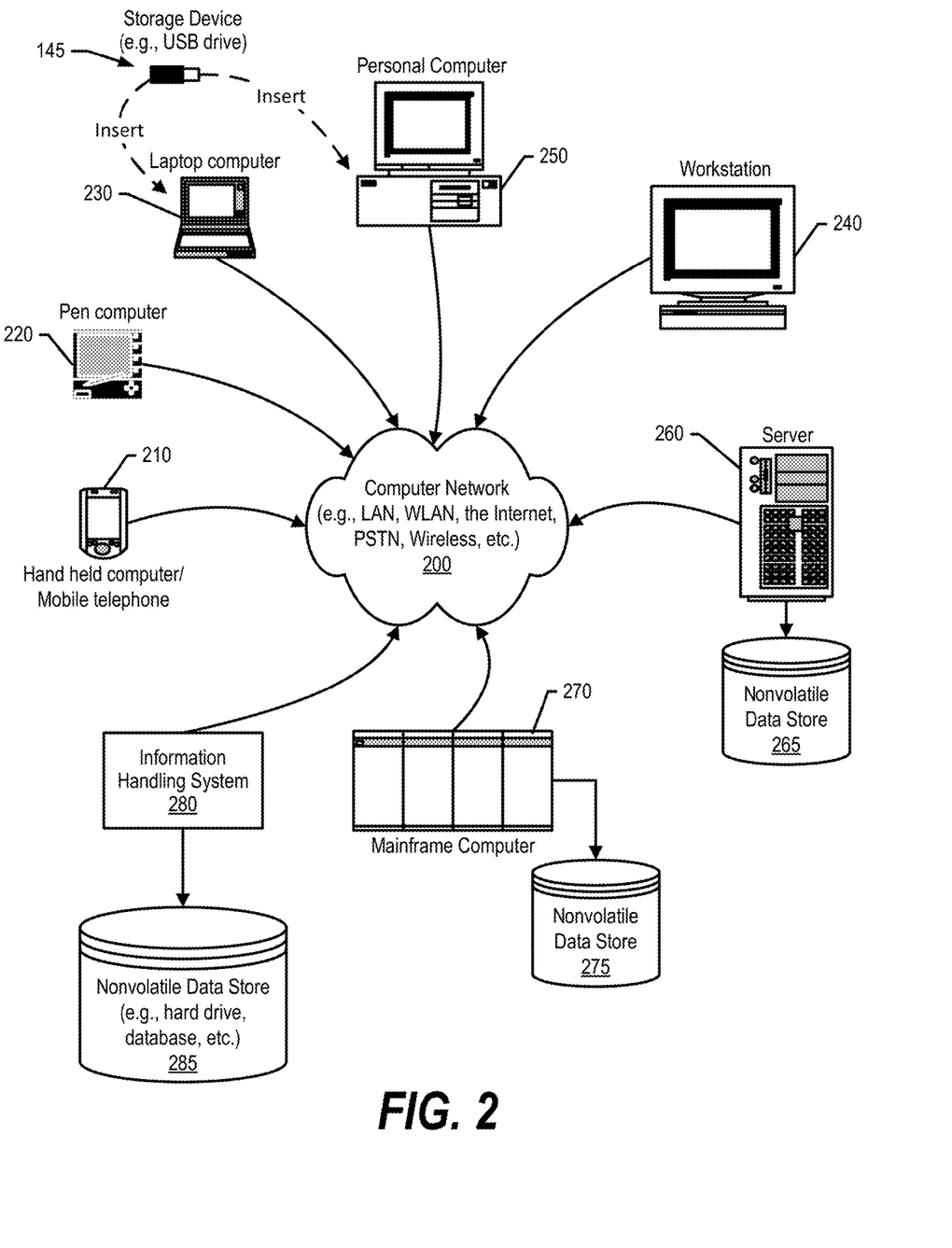
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, prior document processing systems rely on reliable text extraction, understanding the text content, and understanding the context of the document. However, when an enterprise requirement is to scale to millions of documents from various sources, even within the same context (e.g., financial documents), the prior document processing systems do not function adequately because the different document structures are not consistent in context (e.g., different organization, different row/column fields, etc.). There is therefore a need to have a document processing system that is context free (does not rely on the context of the document) and reliably scales across multiple documents/document types.

Commercially available OCR engines extract text from documents or images with reasonable resolution. However, the OCR engines loose document structure (e.g., Is "5345" an invoice number, a phone number, a dollar amount, etc.) and the extracted text is therefore unusable from a data analysis standpoint. Many enterprise problems also require an understanding of the document structure so extraction is meaningful such as the case with invoices, resumes, orders, tickets etc. Today's document processing systems require a learning or training process that, in turn, makes the extraction process difficult to scale. Furthermore, each document and its source are unique in its structure (e.g., different vendor invoices). As a result, learning on a sample document set often fails to be reliable on a large scale of documents that are different in structure.

FIGS. 3 through 10 depict an approach that digitizes a document into a bitmap image and recursively decomposes the bitmap image into image portions based on identifying the structure of the document through Fourier transforms. The approach does not rely on understanding the content of a document, but treats a document as a bitmap image and extracts the underlying structure of the document to decompose the document image. The approach then provides the decomposed image portions to a text recognition system to reliably parse the image portions using standard OCR techniques for highly reliable extraction. The approach increases reliability by removing backgrounds (homogenous backgrounds) and typesetting for each decomposed image portion corresponding to the original document. As described herein, a text recognition system is any system that recognizes text included in an image.

As discussed herein, the approach (i) measures aggregate intensity signals of a document bitmap image and document normalization; (ii) uses a localized Fourier transform to estimate document frequency spectrum and analyze low frequency (low change in bitmap values between row/columns) and high frequency (high change in bitmap values between rows/column) parts of the image; (iii) uses a Fourier Spectrum-based decision tree partition method to decompose images into image portions with disjoint information content; (iv) uses a decision tree-based decomposition stopping method to avoid over-decomposition; and (v) maps the decomposed document onto a matrix of cells (e.g., spreadsheet).

Figure 3:
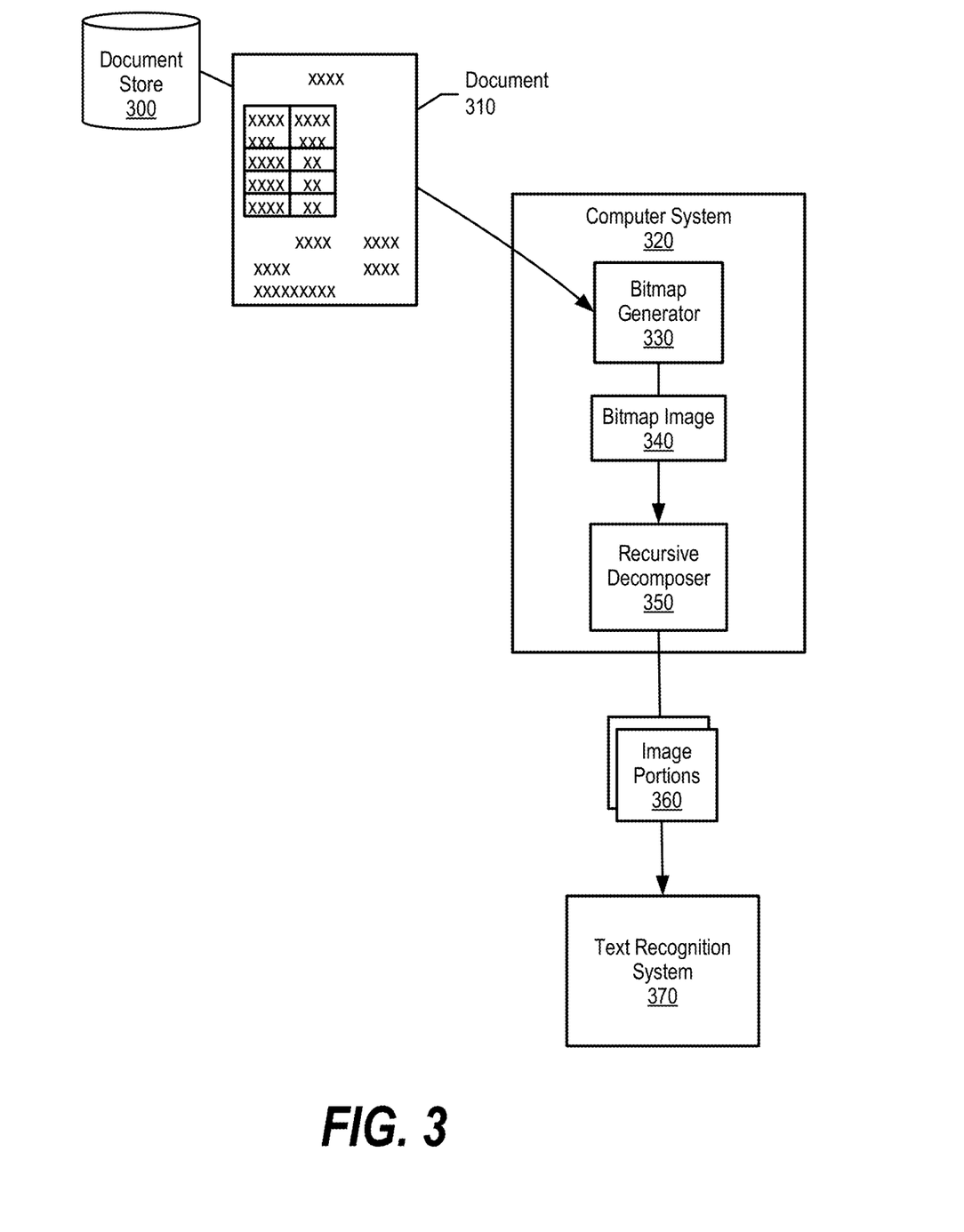
FIG. 3 is an exemplary diagram depicting a computer system that digitizes a document into a bitmap image and recursively decomposes the bitmap image into image portions that feed into a text recognition system.

FIG. 3 is an exemplary diagram depicting a computer system 320 that digitizes document 310 into a bitmap image 340 and recursively decomposes bitmap image 340 into image portions 360 that feed into text recognition system 370. As discussed herein, computer system 320 enhances today's cognitive digitization products by providing (i) an automatic scalable context-free extraction of document structure; (ii) a reliable extraction of text from document 310 having variable backgrounds within the same document (overcomes an averaging behavior of known text extractors); and (iii), color shades and performs reliably with poor quality source documents independent of the document language.

Figure 4:
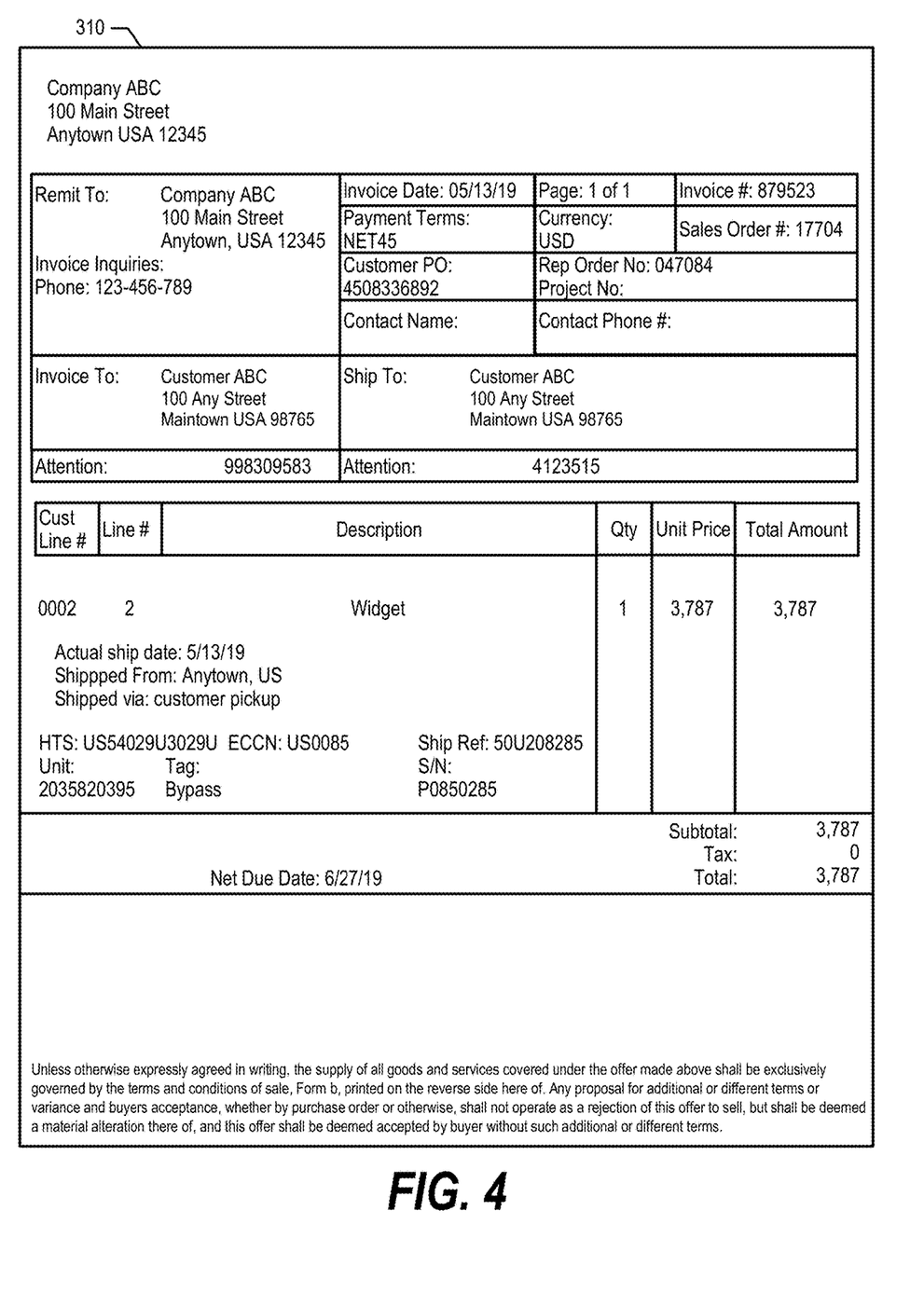
FIG. 4 is an exemplary diagram depicting an invoice document ready for decomposition.

Computer system 320 retrieves document 310 from document store 300. Document 310 may be, for example, an invoice as shown in FIG. 4. Computer system 320 uses bitmap generator 330 to create a black and white bitmap image 340 of document 310. In one embodiment, bitmap generator 330 normalizes the bitmap image pixel intensities prior to being processed by recursive decomposer 350 (see FIG. 6 and corresponding text for further details).

Recursive decomposer 350 aggregates the normalized pixel values on a per row/column basis into row sum values (RSVs) and column sum values (CSVs). Recursive decomposer 350 then groups the row sum values into a row sum signal; groups the column sum values into a column sum signal; and applies a localized Fourier transform (e.g., a Short-Time Fourier Transform (STFT)) on the row sum signal and column sum signal to generate frequency representations of the row sum signal and the column sum signal (see FIGS. 6, 8, and corresponding text for further details).

Recursive decomposer 350 trims the boundaries (e.g., removes white margins) and cuts the image into two image portions 360 based on the localized Fourier transform results. Recursive decomposer 350 recursively decomposes the image portions 360 until image portions 360 reach a size where they are not able to be decomposed further, at which point image portions 360 are sent to text recognition system 370 for further processing.

For example, text recognition system 370 may apply optical character recognition (OCR) on an individual basis to each of image portions 360. As such, text recognition system 370 has an advantage over prior OCR engines because, by applying OCR individually to each of image portions 360, text recognition system 370 extracts information more reliably as each component of the decomposed document has homogenous background and typesetting. In addition, the approach discussed herein helps text recognition system 370 to discover association rules without a need to assign meaning to each attribute. For example, text recognition system 370 may discover an association rule that a number corresponding to a heading "Invoice Number" will always be in the same cell as the heading or in the cell to the right of the cell or in the cell below the given cell.

FIG. 4 is an exemplary diagram depicting an invoice document ready for decomposition using the approach discussed herein. Document 310 is an invoice that includes various amounts of information. Document 310 may have a document structure different from previously evaluated invoices, which is irrelevant to the approach discussed herein because computer system 320 decomposes each document individually based on its document structure and not on the context in the document (see FIG. 5 and corresponding text for further details).

Figure 5:
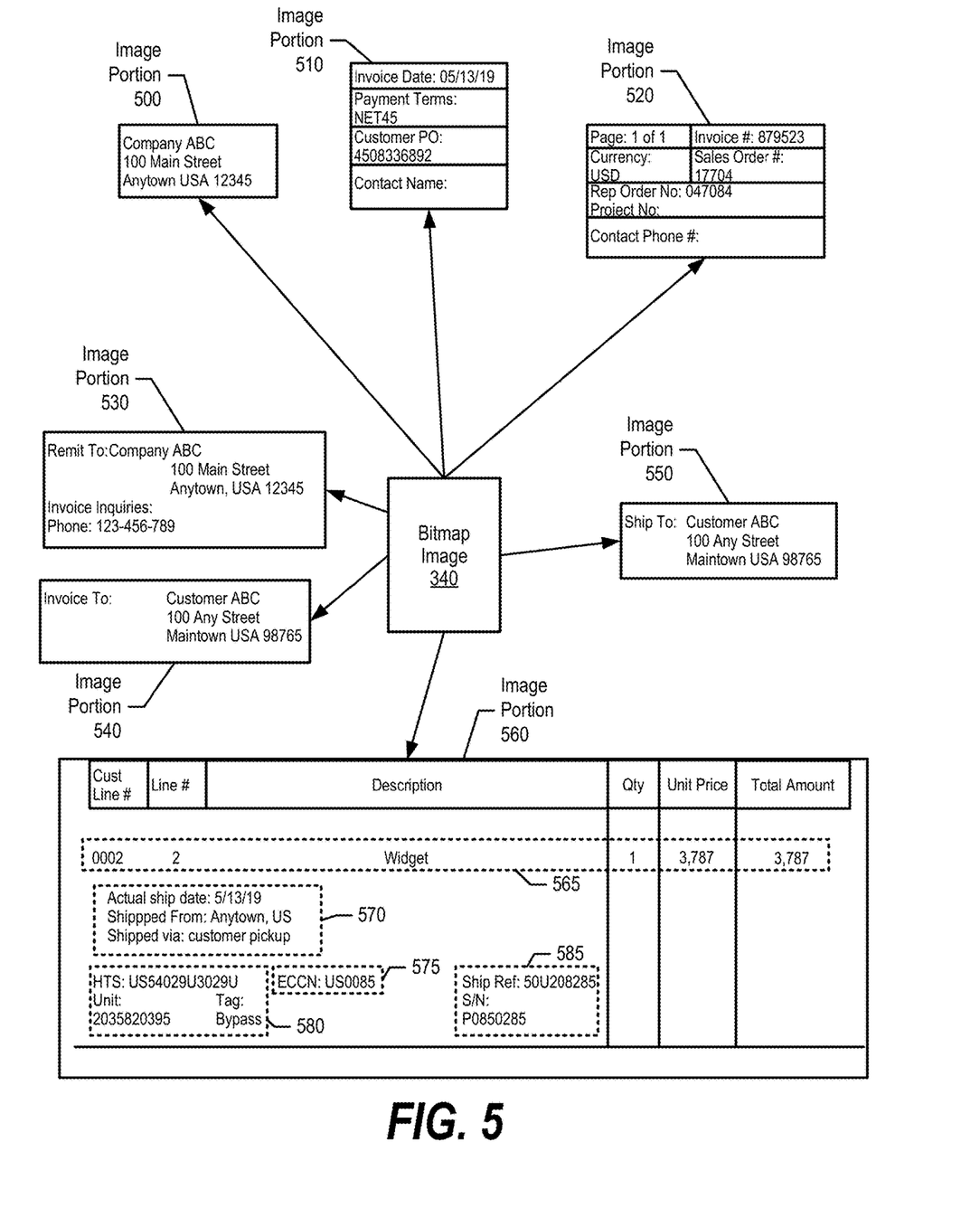
FIG. 5 is an exemplary diagram depicting a bitmap image decomposed into image portions.

FIG. 5 is an exemplary diagram depicting a bitmap image decomposed into image portions. As shown in FIG. 3, bitmap generator 330 creates bitmap image 340 from document 310. In turn, recursive decomposer 350 generates image portions 360. FIG. 5 shows details of image portions 360 corresponding to document 310 shown in FIG. 4, which are image portions 500, 510, 520, 530, 540, 550, and 560.

As discussed herein, when a first pass of decomposing an image produces an image portion that can be further decomposed, recursive decomposer 350 performs steps to further decompose the image portion. As such, recursive decomposer 350 decomposes image portion 560 on subsequent recursive decompositions (one or more) into separate image portions 565, 570, 575, 580, and 590 (see FIGS. 6, 7, and corresponding text for further details).

Figure 6:
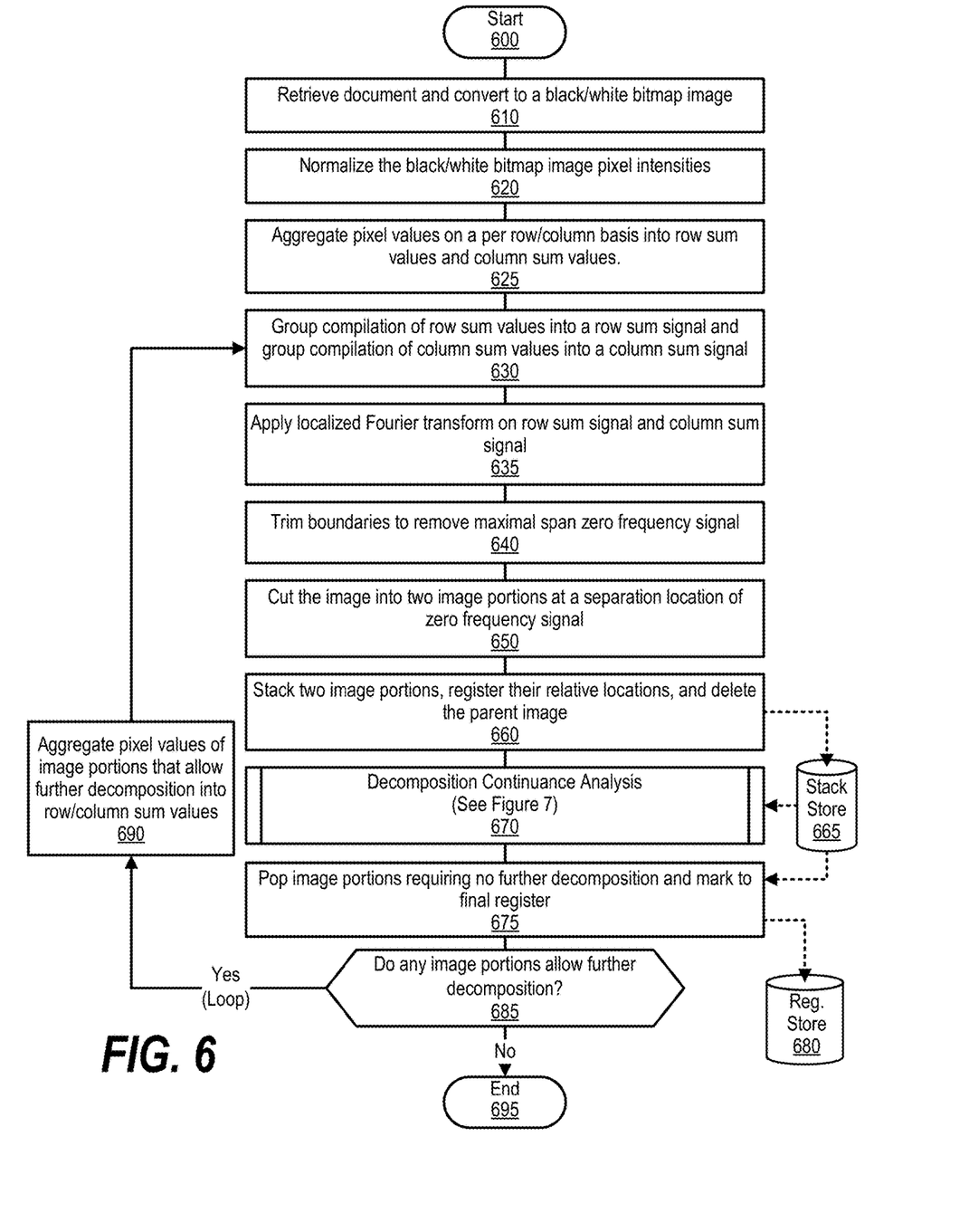
FIG. 6 is an exemplary flowchart showing steps taken to convert a document to bitmap image and recursively decompose the bitmap image into image portions.

FIG. 6 is an exemplary flowchart showing steps taken to convert a document to bitmap image and recursively decompose the bitmap image into image portions. Processing commences at 600 whereupon, at step 610, the process retrieves a document and converts the document to a black/white bitmap image. At step 620, the process normalizes the black/white bitmap image pixel intensities. At this point, in one embodiment, each pixel is represented by either a "1" (black pixel) or "0" (white pixel).

At step 625, the process aggregates the normalized pixel values on a per row/column basis into row sum values (RSVs) and column sum values (CSVs). For example, assuming a row includes 1,000 pixels, a row sum for a black line is the sum of 1,000 "1's"=1,000 and a row sum for a white space is the sum of 1,000 "0's"=0. At step 635, the process groups the row sum values into a row sum signal and groups the column sum values into a column sum signal (see FIG. 8 and corresponding text for further details).

At step 635, the process applies a localized Fourier transform on the row sum signal and column sum signal. In one embodiment, the process uses a Short-Time Fourier Transform (STFT) as the localized Fourier transform:

$$X_m(\omega) = \sum_{n=-\infty}^{\infty} x(n)w(n-mR)e^{-j\omega n}$$

where:
x(n)=input signal at time n
w(n)=length M window function (e.g., Hamming window)
Xm(w)=DTFT (Discrete Time Fourier Transform) of windowed data centered about time mR
R=hop size in samples between successive DTFTs In this embodiment, the window length M is generally fixed for a document and is typically set equal to a multiple of line spacing. The line spacing is derived by slowly increasing the window length until a peak pure zero frequency signal is obtained. A long window length provides more DTFT points and leads to more frequency resolution, but also leads to less precision in time. A short window length provides more time slices and more precision in time, but also leads to poor frequency resolution.

At step 640, the process trims the boundaries (e.g., white margins) to remove maximal span zero frequency signals. Zero frequency signals correspond to a contiguous chunk of rows having the same row/column sum values (e.g., row 1 RSV=1,000, row 2 RSV=1,000 . . . ). At step 650, the process cuts the image into two image portions at a separation location of zero frequency signals, which are areas whose adjacent rows/columns values do not change (e.g., white spaces). If there are multiple zero frequency signals, in one embodiment, the process selects the separation location of the zero frequency signal with the longest span. At step 660, the process stacks (stores) the two image portions into stack store 665, registers their relative locations, and deletes the parent image.

Figure 7:
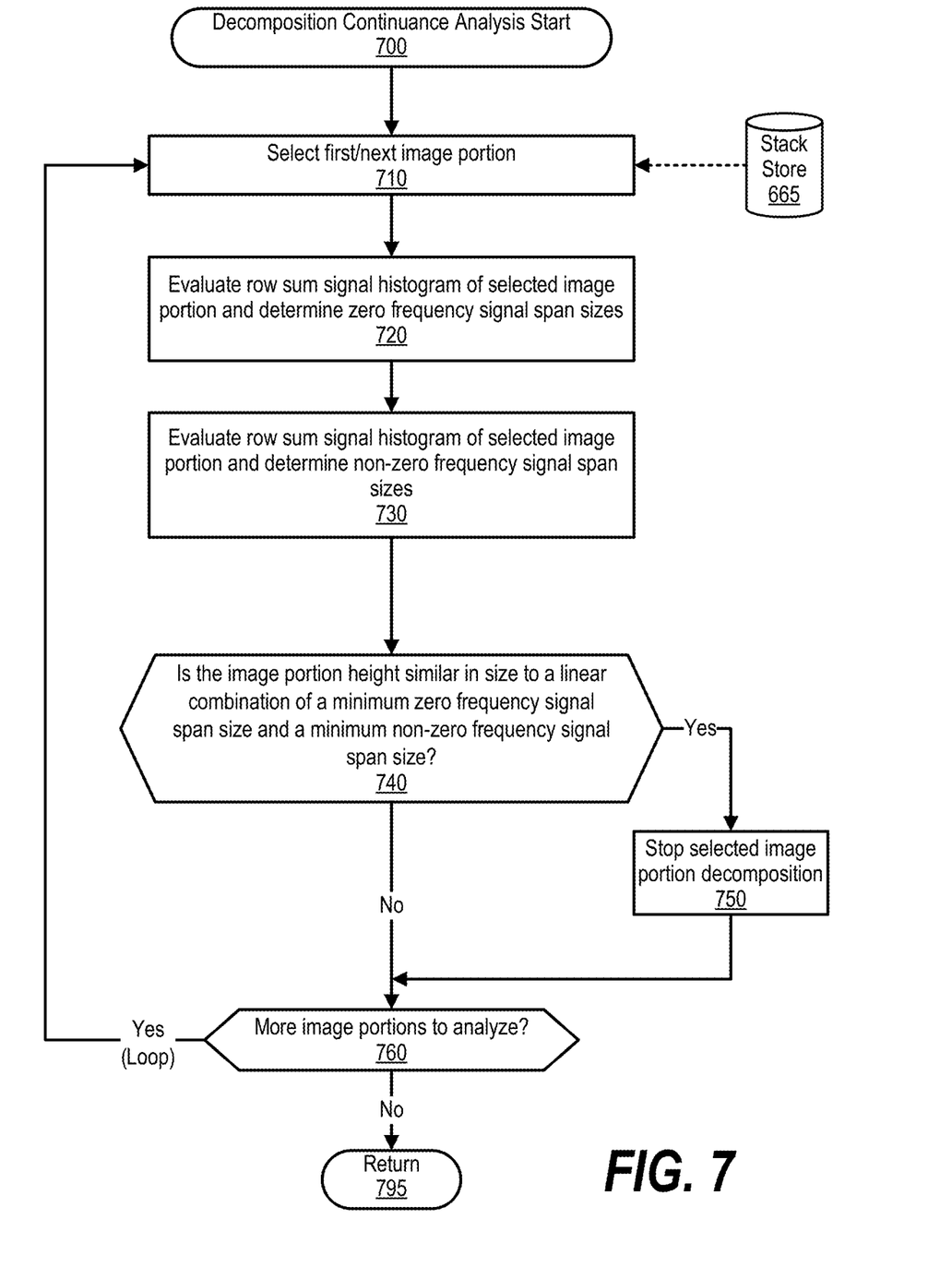
FIG. 7 is an exemplary flowchart showing steps taken to evaluate whether to recursively decompose image portions.

At predefined process 670, the process analyzes the image portions to determine whether one or both of the image portions allow for further decomposition (see FIG. 7 and corresponding text for processing details). At step 675, the process "pops" the image portions that are not able to be decomposed further and marks them in register store 680.

The process determines as to whether there are any more image portions that can be further decomposed based on results from 670 (decision 685). If there are image portions that allow for further decomposition, then decision 685 branches to the 'yes' branch whereupon, at step 690, the process aggregates the pixel values of one of the image portions identified for further decomposition into row/column sum values. The process then processes the row/column sum values according to steps 630 through 675 as discussed above.

This looping continues until none of the image portions allow for further decomposition, at which point decision 685 branches to the 'no' branch exiting the loop. FIG. 6 processing thereafter ends at 695.

FIG. 7 is an exemplary flowchart showing steps taken to evaluate whether to recursively decompose image portions. Processing commences at 700 whereupon, at step 710, the process selects the first image portion in stack store 665. The following steps discussed below evaluate the row sum signal (RSS) histogram of the selected image portion to identify its line spacing and font size, which acts as a stopping criterion to stop images from being decomposed too "thin." When an image is decomposed too thin, for example, a character 'I'
appears to be a black line when the image height is close to the font size, which results in splitting the image at the character.

At step 720, the process evaluates the row sum signal (RSS) histogram of the selected image portion and determines zero frequency signal span sizes. In one embodiment, the process separates the RSS histogram generated in FIG. 6 into two histograms at the separation location to represent the two image portions under evaluation. For example, FIG. 9's RSS histogram 900 corresponds to image portion 510 and shows multiple zero frequency signal spans (x-axis value 25 to 60, 145-155, 180-200, etc.). At step 730, the process evaluates the RSS histogram of the selected image portion and determines non-zero frequency signal span sizes (e.g., spans between zero frequency signals). For example, FIG. 9's RSS histogram 900 shows multiple non-zero frequency row signal spans (x-axis value 60-80, 156-175, etc.).

The process determines as to whether the height of the selected image portion is similar in size to a minimum linear combination of a zero frequency signal span size and a non-zero frequency signal span size (decision 740). The minimum linear combination at some point will be the space between lines of text (line spacing) and the minimum non-zero frequency signal span size (font size). In one embodiment, the process adds a "height buffer" to ensure that the image portion height does not decrease to a size approaching the font size. For example, the process may use a stop rule of "Stop Image Split if Image Height<1.5*minimum zero frequency signal span size+ 1*minimum span length between two consecutive zero frequency signal span sizes (non-zero frequency signal spans)."

If the height of the selected image portion is similar in size to a linear combination of a minimum zero frequency signal span size and a minimum non-zero frequency row signal span, then decision 740 branches to the yes' branch whereupon, at step 750, the process marks the selected image portion as a final image portion decomposition.

On the other hand, if the height of the selected image portion is not similar in size to a linear combination of a minimum zero frequency signal span size and a minimum non-zero frequency row signal span, then decision 750 branches to the 'no' branch.

The process determines as to whether there are more image portions to analyze during the particular analysis round (decision 760). If there are more image portions to analyze, then decision 760 branches to the 'yes' branch which loops back to select and process the next image portion. This looping continues until there are no more image portions to analyze during the particular analysis round, at which point decision 760 branches to the 'no' branch exiting the loop. FIG. 7 processing thereafter returns to the calling routine (see FIG. 6) at 795.

Figure 8:
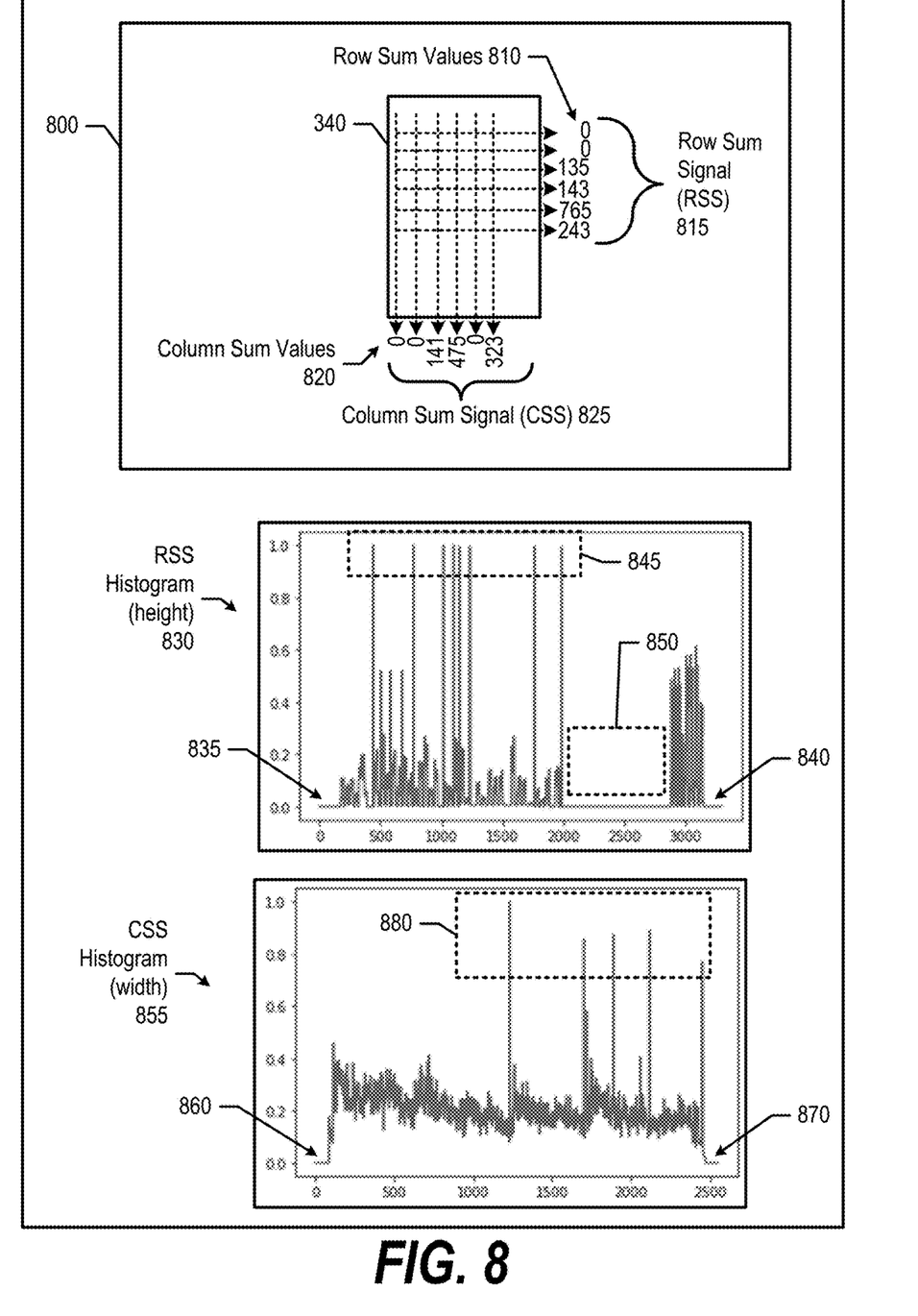
FIG. 8 is an exemplary diagram depicting various diagrams to describe bitmap image decomposition.

FIG. 8 is an exemplary diagram depicting various diagrams to describe bitmap image decomposition. Diagram 800 shows a graphical view of how recursive decomposer 350 aggregates bitmap image values into row sum values 810 and column sum values 820. Each of row sum values 810 are an aggregation of pixel values in its corresponding rows. Likewise, each of column sum values 820 are an aggregation of pixel values in its corresponding column. The values shown in diagram 800 are for explanation purposes and do not correlate with actual values of bitmap image 340.

Recursive decomposer 350 then combines row sum values 810 into row sum signal (RSS) 815 to feed into a localized Fourier transform as discussed herein to produce a frequency representation of differences between the row sum values 810, which is shown in RSS histogram 830 and discussed below. Likewise, recursive decomposer 350 combines column sum values 820 into column sum signal (CSS) 825 to feed into a localized Fourier transform as discussed herein to produce a frequency representation of differences between the column sum values 820, which is shown in CSS histogram 855 discussed below.

RSS histogram 830 shows zero frequency areas 835 and 840, which correspond to upper and lower bitmap boundary areas (margins) in document 310 that are trimmed out during step 640 (FIG. 6). Area 845 shows several high bars that correspond to the horizontal lines on document 310. Area 850 shows a zero frequency area that corresponds to an area between the last horizontal line after the "Total" line and terms and conditions language at the bottom of document 310 (see FIG. 4).

Figure 9:
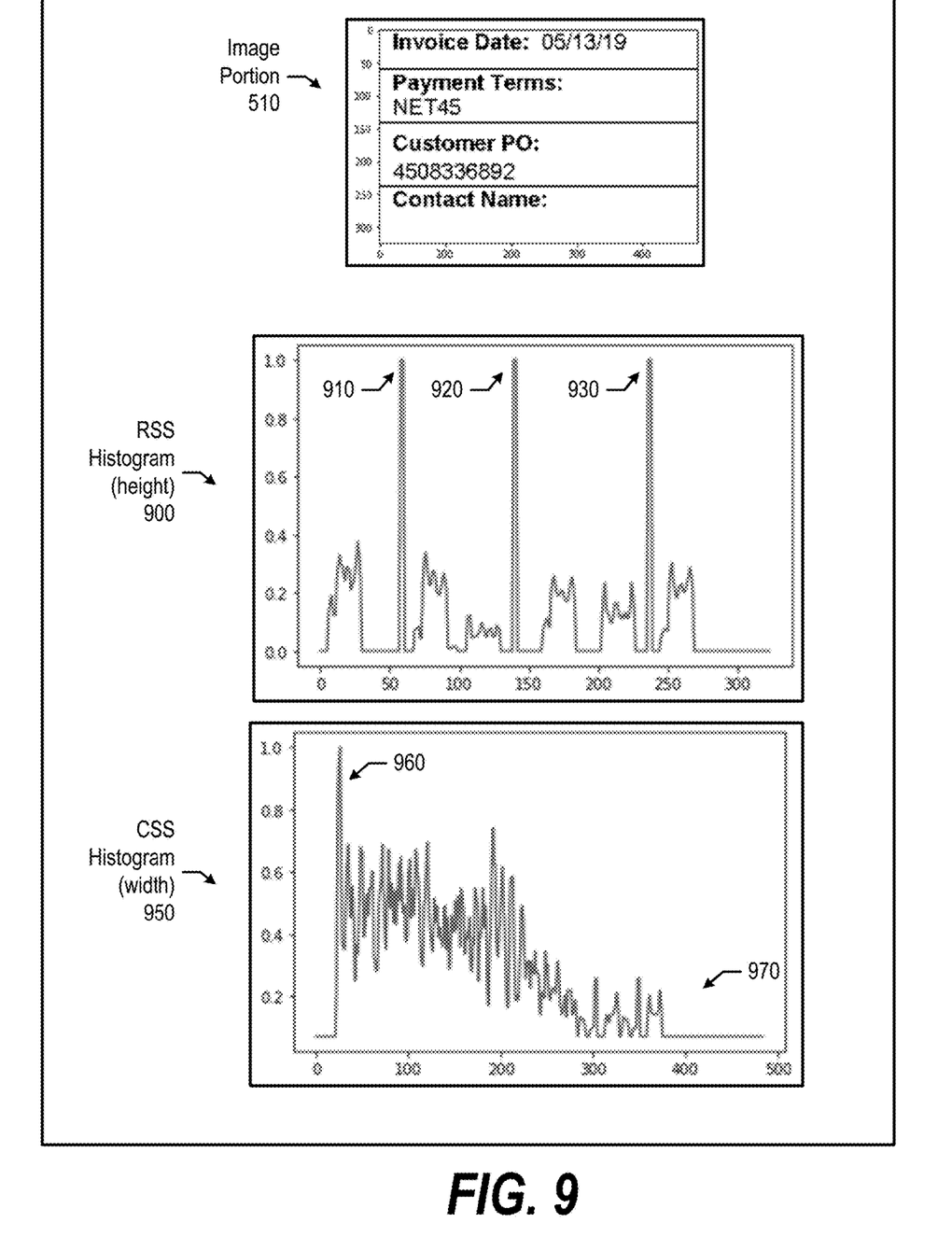
FIG. 9 is an exemplary diagram depicting an image portion and temporal histograms produced from applying a Fourier transform to the image portion.

CSS histogram 855 shows zero frequency areas 860 and 870, which correspond to left and right bitmap boundary areas (margins) in document 310 that are trimmed out during step 640 (FIG. 6). Area 880 shows several high bars that correspond to the vertical lines on document 310. Based on temporal histograms 800 and 850, recursive decomposer 350 decomposes bitmap image 340 into image portions 360 accordingly. For example, recursive decomposer 350 may select a separation location in the middle of area 850 to separate the bitmap image. FIG. 9 shows a further analysis of one of the image portions 360.

FIG. 9 is an exemplary diagram depicting an image portion 510 and temporal histograms 900 and 950 produced from applying a Fourier transform to image portion 510. Image portion 510 is decomposed from bitmap image 340 as discussed herein. Recursive decomposer 350 applies a localized Fourier transform on the row sum signal and column sum signal corresponding to image portion 510 and generates RSS histogram 900 and CSS histogram 950.

RSS histogram 900 corresponds to image 510's height and shows high bars 910, 920, and 930, which correspond to horizontal lines in image portion 510. Based on RSS histogram 900, recursive decomposer 350 determines that image portion 510 is further decomposable vertically based on high bars 910, 920, and 930 as discussed herein.

CSS histogram 950 pertains to image 510's width and shows high bar 960 and zero frequency area 970, which correspond to a vertical line at location 0 and a blank region from locations 375-500, respectively. Based on temporal histogram 950, recursive decomposer 350 determines that image portion 510 is not further decomposable vertically.

Figure 10:
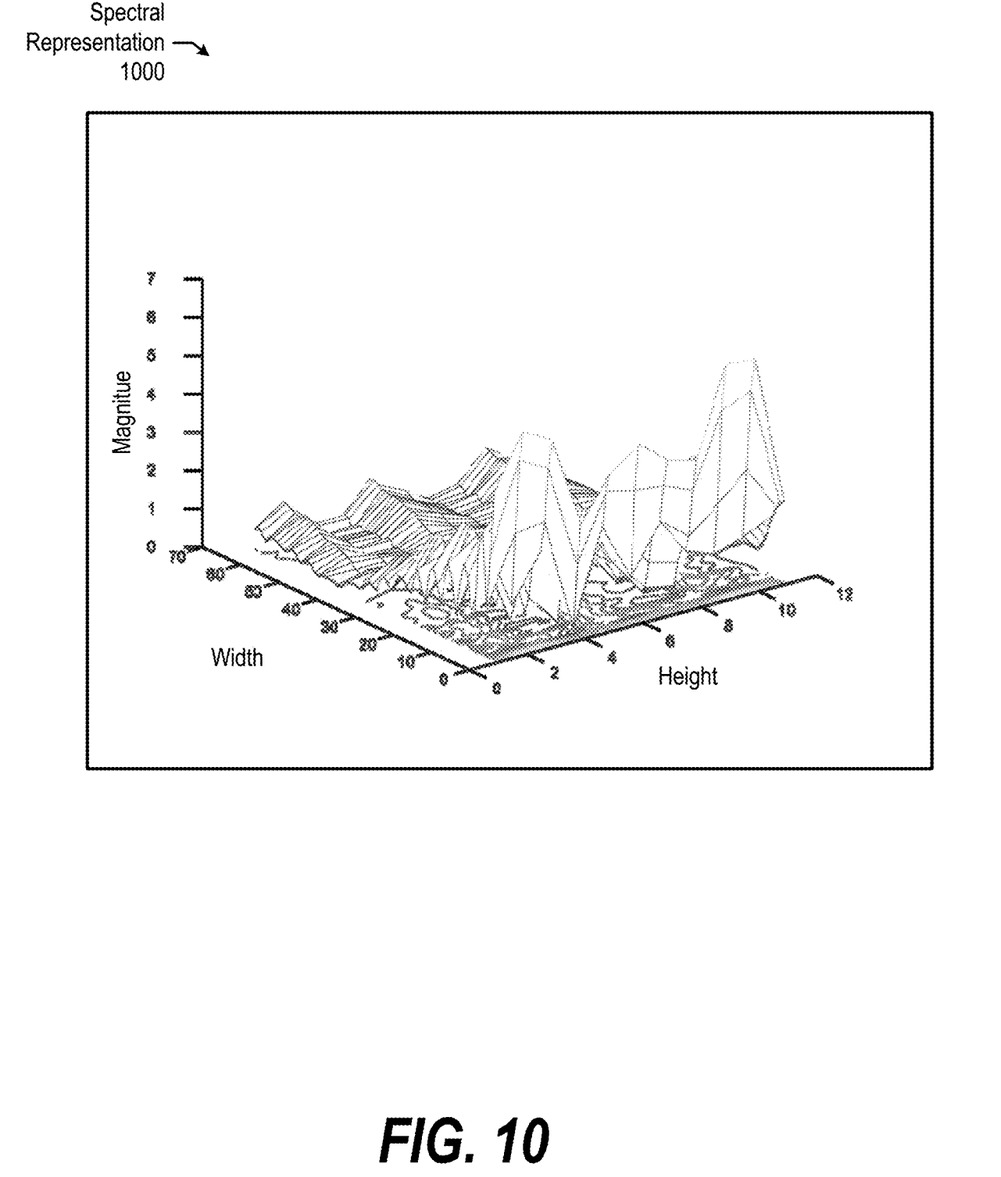
FIG. 10 is an exemplary diagram depicting a spectral representation of an image portion.

FIG. 10 is an exemplary diagram depicting temporal spectral representation 1000 of an image portion with document space (represented as time) along width (X-axis), frequency components along height (Y-axis) and magnitude of frequency or intensity along magnitude (Z-axis). In one embodiment, spectral representation 1000 is a Short-Time Fourier Transform (STFT) of a combination of signals such as a row sum signal (RSS) and a column sum signal (CSS).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
aggregating a set of pixel values from a bitmap image into a set of row sum values and a set of column sum values, wherein the bitmap image is a pixelated representation of a document;
applying a localized Fourier transform to the set of row sum values and the set of column sum values to generate a set of frequency representations of the set of row sum values and the set of column sum values;
decomposing the bitmap image into a set of image portions based on at least one separation location identified in the set of frequency representations; and
sending the set of image portions to a text recognition system.

2. The method of claim 1 further comprising:
combining the set of row sum values into a row sum signal;
combining the set of column sum values into a column sum signal; and
applying the localized Fourier transform to the row sum signal to generate a row frequency representation and applying the localized Fourier transform to the column sum signal to generate a column frequency representation.

3. The method of claim 2 further comprising:
identifying a zero frequency area in the row frequency representation, wherein the zero frequency area corresponds to no change in a subset of the set of row sum values between adjacent rows in the bitmap image; and
selecting the separation location within the zero frequency area.

4. The method of claim 2 wherein, prior to the decomposing, the method further comprises:
identifying a first set of zero frequency areas in the column frequency representation corresponding to a first set of bitmap boundary areas of the bitmap image;
identifying a second set of zero frequency areas in the row frequency representation corresponding to a second set of bitmap boundary areas of the bitmap image; and
removing the first set of bitmap boundary areas and the second set of bitmap boundary areas from the bitmap image.

5. The method of 1 wherein the set of image portions comprise a first image portion and a second image portion, the method further comprising:
aggregating a subset of pixel values from the first image portion into a subset of row sum values and a subset of column sum values;
applying the localized Fourier transform to the subset of row sum values and the subset of column sum values to generate a subset of frequency representations; and
recursively decomposing the first image portion into a third image portion and a fourth image portion based on at least one different separation location identified in the subset of frequency representations.

6. The method of claim 1 wherein the set of frequency representations comprises a row frequency representation corresponding to the set of row sum values, and wherein the set of image portions comprise a first image portion and a second image portion, the method further comprising:
evaluating a portion of the row frequency representation corresponding to the first image portion;
identifying, from the evaluating, a minimum linear combination of a zero frequency signal span size and a non-zero frequency signal span size;
determining whether the minimum linear combination is in proximity to a height of the first image portion; and
terminating decomposition of the first image in response to determining that the minimum linear combination is in proximity to a height of the first image portion.

7. The method of claim 1 further comprising:
applying, by the text recognition system, optical character recognition to each of the set of image portions to generate a set of text portions, wherein each text portion in the set of text portions corresponds to one of the image portions.

8. The method of claim 1 wherein, prior to the aggregating, the method further comprises:
converting the document to a black/white image comprising a set of pixel intensities; and
normalizing the set of pixel intensities to generate the set of pixel values.

9. An information handling system comprising:
one or more processors;
a memory coupled to at least one of the processors;
a set of computer program instructions stored in the memory and executed by at least one of the processors in order to perform actions of:
aggregating a set of pixel values from a bitmap image into a set of row sum values and a set of column sum values, wherein the bitmap image is a pixelated representation of a document;
applying a localized Fourier transform to the set of row sum values and the set of column sum values to generate a set of frequency representations of the set of row sum values and the set of column sum values;
decomposing the bitmap image into a set of image portions based on at least one separation location identified in the set of frequency representations; and
sending the set of image portions to a text recognition system.

10. The information handling system of claim 9 wherein the processors perform additional actions comprising:
combining the set of row sum values into a row sum signal;
combining the set of column sum values into a column sum signal; and
applying the localized Fourier transform to the row sum signal to generate a row frequency representation and applying the localized Fourier transform to the column sum signal to generate a column frequency representation.

11. The information handling system of claim 10 wherein the processors perform additional actions comprising:
identifying a zero frequency area in the row frequency representation, wherein the zero frequency area corresponds to no change in a subset of the set of row sum values between adjacent rows in the bitmap image; and
selecting the separation location within the zero frequency area.

12. The information handling system of claim 10 wherein, prior to the decomposing, the processors perform additional actions comprising:
identifying a first set of zero frequency areas in the column frequency representation corresponding to a first set of bitmap boundary areas of the bitmap image;
identifying a second set of zero frequency areas in the row frequency representation corresponding to a second set of bitmap boundary areas of the bitmap image; and
removing the first set of bitmap boundary areas and the second set of bitmap boundary areas from the bitmap image.

13. The information handling system of claim 9 wherein the set of image portions comprise a first image portion and a second image portion, and wherein the processors perform additional actions comprising:
aggregating a subset of pixel values from the first image portion into a subset of row sum values and a subset of column sum values;
applying the localized Fourier transform to the subset of row sum values and the subset of column sum values to generate a subset of frequency representations; and
recursively decomposing the first image portion into a third image portion and a fourth image portion based on at least one different separation location identified in the subset of frequency representations.

14. The information handling system of claim 9 wherein the set of frequency representations comprises a row frequency representation corresponding to the set of row sum values, and wherein the set of image portions comprise a first image portion and a second image portion, the processors performing additional actions comprising:
evaluating a portion of the row frequency representation corresponding to the first image portion;
identifying, from the evaluating, a minimum linear combination of a zero frequency signal span size and a non-zero frequency signal span size;
determining whether the minimum linear combination is in proximity to a height of the first image portion; and
terminating decomposition of the first image in response to determining that the minimum linear combination is in proximity to a height of the first image portion.

15. The information handling system of claim 9 wherein the processors perform additional actions comprising:
applying, by the text recognition system, optical character recognition to each of the set of image portions to generate a set of text portions, wherein each text portion in the set of text portions corresponds to one of the image portions.

16. A computer program product stored in a computer readable storage medium, comprising computer program code that, when executed by an information handling system, causes the information handling system to perform actions comprising:
aggregating a set of pixel values from a bitmap image into a set of row sum values and a set of column sum values, wherein the bitmap image is a pixelated representation of a document;
applying a localized Fourier transform to the set of row sum values and the set of column sum values to generate a set of frequency representations of the set of row sum values and the set of column sum values;
decomposing the bitmap image into a set of image portions based on at least one separation location identified in the set of frequency representations; and
sending the set of image portions to a text recognition system.

17. The computer program product of claim 16 wherein the information handling system performs further actions comprising:
- combining the set of row sum values into a row sum signal;
- combining the set of column sum values into a column sum signal; and
- applying the localized Fourier transform to the row sum signal to generate a row frequency representation and applying the localized Fourier transform to the column sum signal to generate a column frequency representation.

18. The computer program product of claim 17 wherein the information handling system performs further actions comprising:
- identifying a zero frequency area in the row frequency representation, wherein the zero frequency area corresponds to no change in a subset of the set of row sum values between adjacent rows in the bitmap image; and
- selecting the separation location within the zero frequency area.

19. The computer program product of claim 17 wherein, prior to the decomposing, the information handling system performs further actions comprising:
- identifying a first set of zero frequency areas in the column frequency representation corresponding to a first set of bitmap boundary areas of the bitmap image;
- identifying a second set of zero frequency areas in the row frequency representation corresponding to a second set of bitmap boundary areas of the bitmap image; and
- removing the first set of bitmap boundary areas and the second set of bitmap boundary areas from the bitmap image.

20. The computer program product of claim 16 wherein the set of image portions comprise a first image portion and a second image portion, the information handling system performing further actions comprising:
- aggregating a subset of pixel values from the first image portion into a subset of row sum values and a subset of column sum values;
- applying the localized Fourier transform to the subset of row sum values and the subset of column sum values to generate a subset of frequency representations; and
- recursively decomposing the first image portion into a third image portion and a fourth image portion based on at least one different separation location identified in the subset of frequency representations.

* * * * *